United States Patent
Kakishay

(10) Patent No.: US 9,225,768 B2
(45) Date of Patent: Dec. 29, 2015

(54) PROVIDING NETWORK-APPLICABLE CONTENT

(71) Applicant: Yotam Kakishay, Tel Aviv (IL)

(72) Inventor: Yotam Kakishay, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 274 days.

(21) Appl. No.: 13/760,573

(22) Filed: Feb. 6, 2013

(65) Prior Publication Data

US 2014/0222993 A1    Aug. 7, 2014

(51) Int. Cl.
    *H04L 29/08*    (2006.01)
    *H04W 4/18*     (2009.01)

(52) U.S. Cl.
    CPC *H04L 67/04* (2013.01); *H04W 4/18* (2013.01)

(58) Field of Classification Search
    CPC .... H04L 29/08072; H04L 29/06; H04L 43/00
    USPC ......................................................... 709/224
    See application file for complete search history.

(56) References Cited

U.S. PATENT DOCUMENTS

| | | | | |
|---|---|---|---|---|
| 6,243,761 B1 * | 6/2001 | Mogul et al. | | 709/246 |
| 8,706,802 B1 * | 4/2014 | Dayan et al. | | 709/203 |
| 2002/0120721 A1 * | 8/2002 | Eilers | | G06F 17/30905 709/220 |
| 2006/0184639 A1 * | 8/2006 | Chua | | G06F 17/30905 709/217 |
| 2008/0126227 A1 | 5/2008 | Banino et al. | | |
| 2008/0281965 A1 * | 11/2008 | Zhong | | H04L 67/24 709/224 |
| 2009/0259766 A1 * | 10/2009 | Karlsson | | H04N 21/234309 709/231 |
| 2010/0106770 A1 * | 4/2010 | Taylor et al. | | 709/203 |
| 2010/0131671 A1 * | 5/2010 | Kohli et al. | | 709/233 |
| 2010/0145997 A1 | 6/2010 | Zur et al. | | |
| 2011/0320610 A1 * | 12/2011 | Ragunathan | | G06Q 10/0633 709/227 |
| 2012/0259945 A1 * | 10/2012 | Gupta et al. | | 709/217 |
| 2012/0271948 A1 * | 10/2012 | Martin | | H04N 21/2393 709/226 |
| 2013/0346949 A1 * | 12/2013 | Chang | | G06F 9/44589 717/127 |

\* cited by examiner

*Primary Examiner* — Nicholas Taylor
*Assistant Examiner* — Chong G Kim
(74) *Attorney, Agent, or Firm* — Fish & Richardson P.C.

(57) ABSTRACT

The disclosure generally describes computer-implemented methods, software, and systems for providing appropriate content to a client based on the network capability associated with the client. One example method includes identifying a first set of content requested by the client, the first set of content associated with a default set of components for presentation; performing a network capability check associated with the client; determining, based on the capability check of the client, whether the default set of components associated with the first set of content is applicable for use with the client; providing the default set of components associated with the first set of content for presentation where the default set is determined to be applicable with the client; and responsive to determining that the default set is not applicable with the client, identifying at least one alternative component associated with the first set of content for presentation; and providing the least one alternative component associated with the first set of content for presentation.

18 Claims, 3 Drawing Sheets

PROVIDING NETWORK-APPLICABLE CONTENT

BACKGROUND

The present disclosure relates to computer-implemented methods, non-transitory computer-readable media, and computer systems for providing network-applicable content to a client.

Enterprise portals provide frameworks for integrating information, people, and processes across organizational boundaries, providing a centralized and secure access point to an enterprise. Current enterprise portals allow multiple client types to interface with the enterprise portal. These enterprise portals can allow users in different locations to access the central site and its information. Portal pages may have differing levels of complexity, presentations, content portions, and content types. For some network connections and devices, particular portal pages may be difficult or inconvenient to load.

SUMMARY

The disclosure generally describes computer-implemented methods, software, and systems for providing network-applicable content to a client. One example method includes identifying a first set of content requested by the client, the first set of content associated with a default set of components for presentation; performing a network capability check associated with the client; determining, based on the capability check of the client, whether the default set of components associated with the first set of content is applicable for use with the client; providing the default set of components associated with the first set of content for presentation where the default set is determined to be applicable with the client; and responsive to determining that the default set is not applicable with the client, identifying at least one alternative component associated with the first set of content for presentation; and providing the least one alternative component associated with the first set of content for presentation.

The details of one or more implementations of the subject matter of the present disclosure are set forth in the accompanying drawings and the description below. Other features, objects, and advantages of the subject matter will be apparent from the description, the drawings, and the claims.

DETAILED DESCRIPTION

Figure 1:
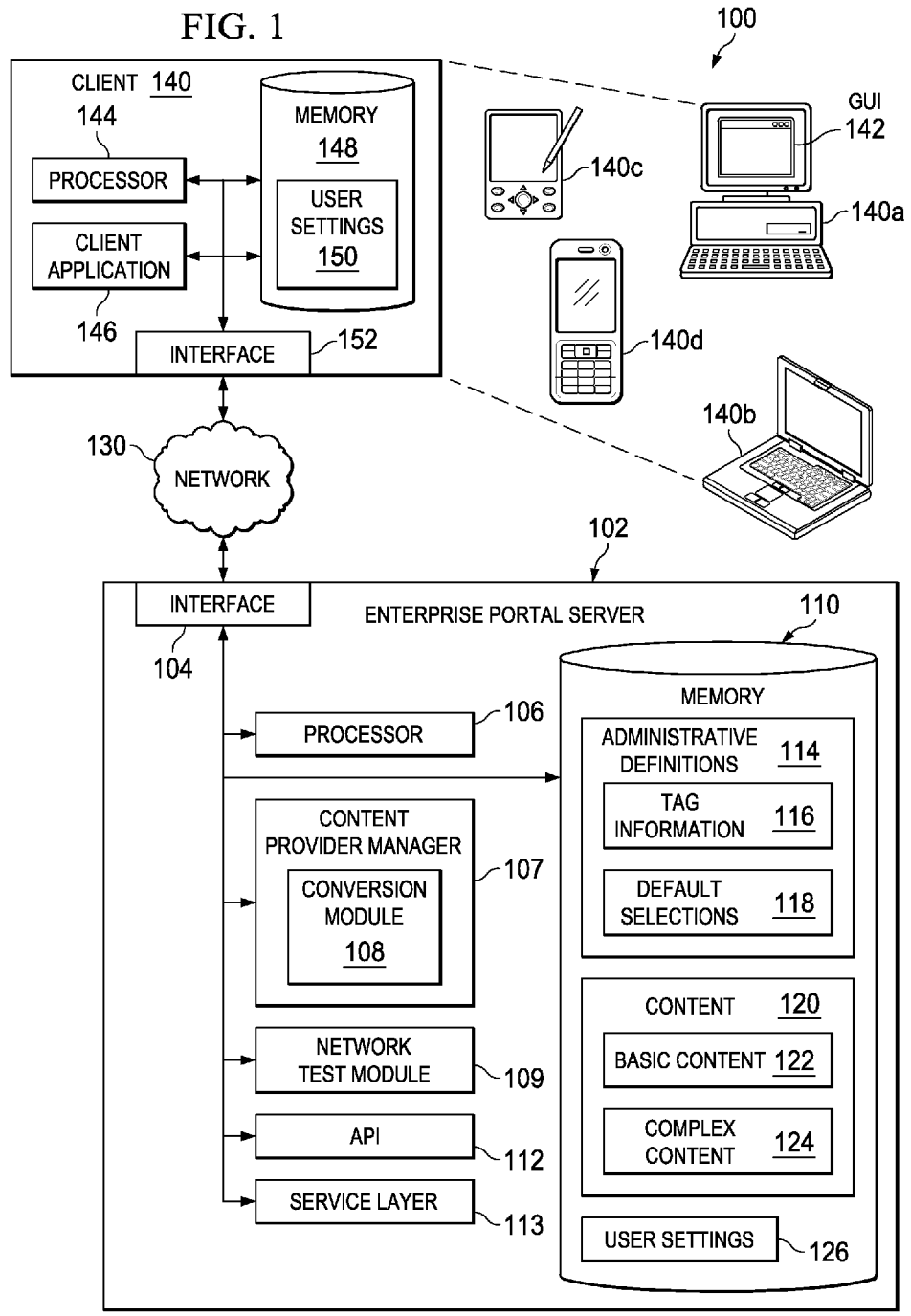
FIG. 1 is a block diagram illustrating an example distributed computing system for providing network-applicable content to a client.

The present disclosure relates to computer-implemented methods, non-transitory computer-readable media, and computer systems for providing network-applicable content to a client.

In particular, the present disclosure describes a content providing mechanism. The content providing mechanism can include adjustments of the content so that the content provided to a client is applicable with the client's capabilities. The content providing mechanism can improve user experience, for example, by solving latency issues of users waiting a long time for heavy content while using a low bandwidth network, and/or by improving the content quality when the users are in a highly capable network. The network-applicable content includes the content that is not only presentable given a network capability associated with the client, but also provides a preferred view for the client. In some instances, the determination of whether the content is applicable or inapplicable can be made based on, for example, whether the content is compatible with the current network capability, whether the content will cause issues in being presented (i.e., data allowance, data throughput, etc.), whether the content complies with the administrative settings, the user's settings, or any other suitable criteria. In some examples, the network-applicable content can be of a low quality but can be presented to the client within a short time, or can be of high quality if the network capability allows.

Generally, a portal server can receive a request for content from a client. The portal server and the client may be connected through a network. To provide network-applicable content to the client, the portal server may identify the network capability associated with the client, for example, by checking a network type (3G, 4G, Wi-Fi, etc.), a device type (modem type, processing capability, etc.), and a current connection quality (such as signal strength, bandwidth, and/or data rate, etc.). After identifying the network capability, the portal server may adjust the content and send the appropriate content for creating a relatively smoother and better experience for the user based on the determined capabilities. The device type may provide further information, including, but not limited to, an actual device name (e.g., iPhone 4s, iPad 3, etc.), an operating system type and/or version (e.g., Mac OS X 10.8, Microsoft Windows 8, etc.).

In some implementations, the network-applicable content can be made in two manners, responsive identification and administrative definitions. Responsive identification can include a runtime assessment of bandwidth capabilities and then, based on the assessment, corresponding adjustments to the content appropriate for the assessed capabilities. For example, the portal server can determine whether to present complex content (full application), basic content (removing Cascading Style Sheet (CSS) files, images, etc.), or some combination thereof. Some example options include, but are not limited to:

- presenting higher or lower resolution images than a default version;
- presenting higher or lower definition videos as compared to a default version;
- using different compressing types for the content; and
- changing the method of presentation for the requested content (e.g., by presenting the content sequentially; loading the text and blank images, and then providing the user the option to add the images afterwards).

In some instances, if no appropriate quality is available (e.g., for movie or image-based content), the portal server may suggest a conversion of the content, and allow the user to accept or view another version with a similar or otherwise applicable quality.

Administrative definitions may include an administrative user's settings related to content, components of the content, applications, and/or network capabilities. For example, an administrative user may be able to give multiple applications as possibilities for strong and weak networks, and at runtime the appropriate version or selection can be presented based on the determined network capability. As another example, an administrative user may be able to tag parts of application as more important or less important, then less important parts might be omitted when necessary, or when the network capabilities dictate.

FIG. 1 is a block diagram illustrating an example distributed computing system or environment 100 for providing network-appropriate content to a client. Specifically, the illustrated system 100 includes, or is communicably coupled with, an enterprise portal server (EPS) 102 and a client 140 that communicate across a network 130. For example, a user interacting with user interfaces (UIs) presented on the client 140 may interact with the EPS 102 to access a set of content. A plurality of content sets 120 may be stored at the EPS 102, and can be accessed, executed, edited, and otherwise interacted with by the client(s) 140.

The EPS 102 is a server, computer, or plurality of servers or computers capable of performing functions associated with creation, modification, execution, and provision of network-appropriate content to a client 140. The EPS 102 may be part of an end-to-end enterprise resource planning (ERP) system or an analytics system, while in some instances, the EPS 102 may be a dedicated system for providing network-appropriate content. In some instances, the EPS 102 may be a cloud-based system providing services to a plurality of systems.

In some implementations, the EPS 102 includes a content provider manager 107 and a network test module 109. The content provider manager 107 manages various functions associated with the content 120, including content generation, access, modification, deletion, or any other appropriate functions. The network test module 109 can identify a network capability associated with a particular client 140 at runtime. Based on the determined network capability, the content provider manager 107 may adjust the content and prepare network-applicable content for presentation.

At a high level, the EPS 102 comprises an electronic computing device operable to receive, transmit, process, store, or manage data and information associated with the environment 100. Specifically, the EPS 102 illustrated in FIG. 1 is responsible for receiving application requests, such as requests for specified portal content from one or more client applications 146 (described below) associated with the client 140 of the example distributed computing system 100, for responding to the received requests by processing said requests in the content provider manager 107 (described below), and for sending the appropriate response/content from the content provider manager 107 back to the requesting client application 146. In addition to requests from the client 140, requests associated with the content provider manager 107 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single system as encompassing the EPS 102, environment 100 can be implemented using two or more servers or computers, as well as computers other than servers, including a server pool, to implement the EPS 102. Indeed, the EPS 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated EPS 102 may be adapted to execute any operating system, including Linux, UNIX, Windows, Mac OS®, Java™, Android™, iOS™, or any other suitable operating system. According to one implementation, the EPS 102 may also include or be communicably coupled with an e-mail server, a Web server, a caching server, a streaming data server, and/or other suitable server. Similar flexibility and variation may be associated with the other components illustrated in FIG. 1, including clients 140, each of which may be comprised of different components, component types, and operating systems in different implementations.

In some implementations, any and/or all components of the EPS 102, both hardware and/or software, may interface with each other and/or the interface using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the example distributed computing system 100. The functionality of the EPS 102 may be accessible for all service consumers using this service layer. Software services, such as those provided by the service layer 113, provide reusable, defined business functionalities through a defined interface. For example, the interface may be software written in JAVA, C++, or another suitable language providing data in extensible markup language (XML) format or other suitable format.

While illustrated as an integrated component of the EPS 102 in the example distributed computing system 100, alternative implementations may illustrate the API 112 and/or the service layer 113 as stand-alone components in relation to other components of the example distributed computing system 100. Moreover, any or all parts of the API 112 and/or the service layer 113 may be implemented as child, sub-modules, or portions of another software module, enterprise application, or hardware module without departing from the scope of this disclosure.

The EPS 102 includes an interface 104, a processor 106, and a memory 110. The interface 104 is used by the EPS 102 for communicating with other systems in a distributed environment—including within the environment 100—connected to the network 130, for example, one or more clients 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated environment 100.

Generally, the EPS 102 (and other components within environment 100) may be communicably coupled with a network 130 that facilitates wireless or wireline communications between the components of the environment 100, as well as with any other local or remote computer, such as additional clients, servers, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the components associated with the system may be included within the network 130 as one or more cloud-based services or operations.

The network 130 may be all or a portion of an enterprise or secured network, while in another instance, at least a portion of the network 130 may represent a connection to the Internet.

In some instances, a portion of the network 130 may include a portion of a cellular or mobile data network or other network capable of relaying short message service (SMS) or multimedia messaging service (MMS) messages, as well as other suitable mobile data messaging. In some instances, a portion of the network 130 may be a virtual private network (VPN). Further, all or a portion of the network 130 can comprise either a wireline or wireless link. Example wireless links may include IEEE 802.11a/b/g/n, 802.20, WiMax, 3G, 4G (e.g., LTE/LTE-Advanced), and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

As also illustrated in FIG. 1, the EPS 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the EPS 102. Specifically, the processor 106 executes the functionality required to receive, process, and respond to requests from the client(s) 140, particularly the functionality required to provide network-applicable content to a client 140 for presentation, as well as to perform the operations associated with other modules (such as, a network test module 109 (described below)) inside the EPS 102, as well as other components' related modules and functionality, including communicating and working with the one or more clients 140 and/or other systems (not illustrated) in the environment 100.

Regardless of the particular implementation, "software" may include computer-readable instructions, firmware, wired and/or programmed hardware, or any combination thereof on a tangible medium (transitory or non-transitory, as appropriate) operable, when executed, to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The EPS 102, as illustrated, also includes a network test module 109. The network test module 109 performs network capability checks of a client 140. In some implementations, the network capability check includes a device type check, a network type check, and/or a connection quality check at runtime, as well as any other suitable checks. The network capability associated with the client 140 can be derived based, at least in part, on one or more of the above three check results. The device type can provide information about a modem used in the client 140, which can reflect the device's capabilities in receiving, transmitting, and/or processing data, as well as processing capabilities and other device-specific information. As an example, a smartphone is typically equipped with a more advanced transceiver and processor than a regular cellphone, thus the smartphone may have a greater network capability than the regular cellphone, given the same other conditions. Similarly, different models or versions of a particular device may have different capabilities. One version of a particular smartphone may only be capable of 3G speeds, while another may be capable of 4G type speeds and transmissions. Further, certain devices and their operating systems may not be applicable with some content types, such that alternative formats may be needed for some content to be presented. The device type check may provide further information regarding the device, including, but not limited to, an actual device name (e.g., iPhone 4s, iPad 3, etc.), an operating system type and/or version (e.g., Mac OS X 10.8, Microsoft Windows 8, etc.), and other information and device definitions. In some instances, a user agent received from or included in the request for the device may be used to provide information on the device. The user agent can be a string in HTTP that provides a list of product tokens (keywords) and optional comments. The user agent, for instance, can include information defining the device type, a browser type and version, a layout engine and version, system details, rendering engine compatibilities, browser platforms and related details, and available functionality.

The network type can provide information about general network-related information such as supportable downlink/uplink data rate, bandwidth, spectral efficiency, and any other useful information related to the network's general ability in providing communication service. For example, an LTE/LTE-Advanced network is able to support a higher data rate than a GSM/GPRS network, and hence a client connected to an LTE/LTE-Advanced network may be considered to have greater network capability than a device connected to a GSM/GPRS network, given the same other conditions. With the same device type and network type, a user may experience different connection qualities depending on, for example, currently available resources (bandwidth, time slots, single or multiple antennas, etc.), current transmission schemes (modulation types, coding algorithms, etc.), location or mobility of the client, and/or traffic load in the entire network. The connection quality check can identify a current connection quality such as signal strength, download/upload speed, service latency, and/or any other appropriate connection quality indicator associated with the client at the current time a request is received, or alternatively, at a recent time relative to the received request. The identified device type, network type, and the current connection quality, and combinations thereof, can provide a more realistic assessment of the network capability associated with the client 140 at runtime.

The EPS 102 also includes a memory 110 that holds data associated with the portal and the related functionality of the EPS 102. Although illustrated as a single memory 110 in FIG. 1, two or more memories may be used according to particular needs, desires, or particular implementations of the example distributed computing system 100. While memory 110 is illustrated as an integral component of the EPS 102, in alternative implementations, memory 110 can be external to the EPS 102 and/or the example distributed computing system 100. The memory 110 may include any type of memory or database module and may take the form of volatile and/or non-volatile memory including, without limitation, magnetic media, optical media, random access memory (RAM), read-only memory (ROM), removable media, or any other suitable local or remote memory component. The memory 110 may store various objects or data, including caches, classes, frameworks, applications, backup data, business objects, jobs, web pages, web page templates, database tables, repositories storing business and/or dynamic information, business object universes, database and data source connection-related information, product information, customer information, and any other appropriate information including any parameters, variables, algorithms, instructions, rules, constraints, or references thereto associated with the purposes of the EPS 102. Additionally, the memory 110 may include any other appropriate data, such as VPN applications, firmware logs and policies, firewall policies, a security or access log, print or other reporting files, as well as others. As illustrated in FIG. 1, memory 110 includes information associated with one or more instances of administrative definitions 114, content 120, and user settings 126.

The content sets 120 may include, among other things, text, images, sounds, videos, animations, and/or other suitable content. While illustrated as integrated with memory 110 of the EPS 102 in the example distributed computing system 100, in alternative implementations, the content 120 can be external to the EPS 102 and/or the example distributed computing system 100, for example associated with external content providers (not illustrated). The content 120 may include basic content 122 and complex content 124. While the complex content 124 may refer to, for example, a full application that includes all available text, images, sounds, videos, animations, CSS files, and/or other content, possibly with rich format, the basic content 122 may refer to a simplified application where one or more of text, images, sounds, videos, animations, CSS files, and/or the like are removed or modified so that the size of the basic content is smaller than its complex content counterpart, or otherwise applicable with particular clients 140. The content 120 may be managed by the content provider manager 107. In some implementations, the complex content 124 or the basic content 122 may be converted to an alternative content type by the conversion module 108.

The administrative definitions 114 are data associated with and defined by an administrative user. The administrative definitions 114 may include, among other things, configurations, rules, and/or priority information, as defined by the administrative user. The administrative definitions 114 are illustrated as including tag information 116 and default selections 118. The tag information 116 can include the administrative user's classification of a plurality of components of a set of content. The tag information 116 can further include corresponding processing rules (such as priorities) associated with the classified components. For example, an administrative user may be able to tag parts of application as more important or less important. The parts with greater importance may be preserved and/or prioritized while parts with less importance may be omitted, compressed, or substituted by other versions, if necessary. For example, a higher priority part may be served in a limited network connectivity situation, while the lower priority part may be omitted or otherwise modified within the presented page to improve the viewing experience for the user. The default selections 118 can include the administrative user's configurations related to the content 120, applications, and the network capability, among others. For example, the default selections 118 may define the default size, type, format, quality, and/or any other property of the components included in a content set 120. In some instances, the default selections may include a set of default content formats, application types, and/or the like with respect to different network capabilities. For example, an administrative user may be able to identify multiple applications as possibilities for strong and weak networks, respectively, and, at runtime, the EPS 102 can determine the appropriate content to be presented based on a determined network capability.

The user settings 126 are data associated with an EPS 102 user. The user settings 126 data may include the user's preferences related to the content 120 such as user's tolerable latency, total data plan, preferred properties of the content, priorities associated with different content components, preferred presentation orders of different content components, and/or any other appropriate information. In some instances, a portal or related configuration page (not shown) may be presented in which an EPS 102 user can configure one or more preferences and/or rules to be used when receiving portal pages associated with the present disclosure. By configuring these preferences at a central location and at one time, users may experience a more consistent presentation, avoiding the system asking the user repetitive questions during the entire interaction. The configuration may be changed, in some implementations, at any time to allow users freedom to modify their experience. One example user setting may allow the user to choose to get a particular quality X for a component when using network Y. Alternatively, the user may choose to always get quality X for all components, regardless of the network quality or particular network. The quality X may be the best quality available, or it may be a lower quality. In some instances, users may set a minimum quality they will accept. In many instances, this may be relevant for users with limited data packages from their carrier, providing them the ability to choose and select data and component presentations that match or support their data allowance (e.g., when on 3G, always asking for a relatively lower quality and/or amount of content.)

In some implementations, the administrative definitions 114 and the user settings 126 can be overwritten by each other, for example, depending on system configurations.

The EPS 102 is illustrated as including a content provider manager 107, itself including several additional applications, modules, and other software to be executed by the processor 106. The content provider manager 107, as well as its components, can be any application, program, or other software for managing and performing operations associated with the content 120. The content provider manager 107 represents any suitable software, or combination of software, that manages network capability-based content-related functions. To perform these operations, the content provider manager 107 is illustrated as including a conversion module 108. This component and any other or alternative components assist the content provider manager 107 in creating, modifying, and executing the content 120. Specifically, the content provider manager 107 can provide network-applicable content to the client 140 for presentation.

In some implementations, upon a receipt of the particular content request by the client 140, the content provider manager 107 may check with the network test module 109 for the current network capability associated with the client 140. Based on the network capability associated with the client 140, the content provider manager 107 can determine whether content adjustment is needed. If the request content is compatible with the network capability associated with the client 140, the content provider manager 107 can access the requested content in the memory 110 and prepare the content for presentation. If the request content is not compatible with the network capability associated with the client 140, the content provider manager 107 may pass the requested content to the conversion module 108 for processing so that a network-applicable content may be generated. The content provider manager 107 can then prepare the generated network-applicable content for presentation at the client 140.

In some implementations, the processing of the conversion module 108 includes identifying at least an appropriate alternative component associated with the requested content that is compatible with the network capability. In some instances, there may be multiple alternatives to a set of components of the requested content (e.g., videos with different levels of resolution) available in the memory 110 of the EPS 102. The conversion module 108 may be able to select a set of network-applicable alternative components associated with the request content. For example, the conversion module 108 may choose a high resolution video over a low resolution one when the network capability is good, while selecting a low resolution video over a high resolution video when the network capability is poor. In some instances, if no appropriate alternative is available, the EPS 102 may suggest the client 140 accept a conversion of the requested content 120. The suggested conversion may include substituting the requested content with another version (such as a lower/higher resolution version, an excerpt of the original content), adjusting the compression (compression ratio, compression algorithm, etc.) of the content, changing the way of presentation of the content (instead of presenting all content components at the same time, present the components step-by-step), and/or any other suitable adjustments. For example, the conversion module 108 may instruct the content provider manager 107 to first prepare the body of a web page with text and blank images for presentation, and then present available images, animations, video, etc. afterwards.

In some implementations, the conversion module 108 may identify the appropriate alternative component based at least in part on the administrative definitions 114 and/or the user settings 126. For instance, the content provider manager 107 may check user preferences in using at least one alternative component for presentation. In some instances, the alternative components may be provided to the client 140 only if the client 140 approves use of the alternative components. In some other implementations, the content provider manager 107 may conduct conversion based on dynamic user preferences. In these cases, the content provider 107 may coordinate with the interface 104 and/or the processor 106 to send a request to the client 140 at runtime when a content conversion is needed. As an example, the request may appear as a popup window in the GUI (e.g., 142, described below) of the client. The user may select or input his/her preferences, with such user preferences being sent back to the EPS 102. The conversion module 108 can then convert the requested content based at least in part on the dynamic user preferences. In the above-mentioned example, after presenting the body of a web page with text and blank images, the content provider manager 107 may give the user a choice if he wants to load the remaining components of the webpage (such as images, flashes). A particular remaining component or an alternative to the particular remaining component may be presented only if the user chooses to load it. In some implementations, the dynamic user preferences can overwrite the default settings of the administrative definitions 114 and the user settings 126.

The client 140 may be any computing device operable to connect to or communicate with at least the EPS 102 using the network 130. In general, the client 140 comprises an electronic computing device operable to receive, transmit, process, and store any appropriate data associated with the example distributed computing system 100. The client includes a processor 144, a client application 146, a memory 148, and/or an interface 152.

The client application 146 is any type of application that allows the client 140 to navigate to/from, request, view, edit, delete, and or manipulate content on the client 140. In some implementations, the client application 146 can be and/or include a web browser. In some implementations, the client-application 146 can use parameters, metadata, and other information received at launch to access a particular set of data from the EPS 102. Once a particular client application 146 is launched, a user may interactively process a task, event, or other information associated with the EPS 102. Further, although illustrated as a single client application 146, the client application 146 may be implemented as multiple client applications in the client 140. In some implementations, the client application 146 may act as a GUI interface for the memory 110 and/or other components of EPS 102 and/or other components of the example distributed computing environment 100.

The interface 152 is used by the client 140 for communicating with other computing systems in a distributed computing system environment, including within the example distributed computing system 100, using network 130. For example, the client 140 uses the interface to communicate with the EPS 102 as well as other systems (not illustrated) that are communicably coupled to the network 130. The interface 152 may be consistent with the above-described interface 104 of the EPS 102 or other interfaces within the example distributed computing system 100. The processor 144 may be consistent with the above-described processor 106 of the EPS 102 or other processors within the example distributed computing system 100. Specifically, the processor 144 executes instructions and manipulates data to perform the operations of the client 140, including the functionality required to send requests to the EPS 102 and to receive and process responses from the EPS 102. The memory 148 may be consistent with the above-described memory 110 of the EPS 102 or other memories within the example distributed computing system 100, and can store objects and/or data associated with the purposes of the client 140. Memory 148 is also shown to contain user settings 150. User settings 150 may be consistent with the above-described user setting 126, and can contain data associated specifically with the purposes of the client 140. In some implementations, user settings 150 may be kept wholly and/or partially consistent with user settings 126 by the EPS 102 and/or the client 140. In some implementations, the user settings 150 may be updated or modified based on, for example, user's responses to the dynamic requests on using alternative components for presentation.

Further, the illustrated client 140 includes a GUI 142. The GUI 142 interfaces with at least a portion of the example distributed computing system 100 for any suitable purpose, including generating a visual representation of a web browser. The GUI 142 may be used to view and navigate various web pages located both internally and externally to the EPS 102. In particular, the GUI 142 may be used to perform functions for providing assisted portal navigation and crowd-based feedback consistent with this disclosure.

There may be any number of clients 140 associated with, or external to, the example distributed computing system 100. For example, while the illustrated example distributed computing system 100 includes one client 140 communicably coupled to the EPS 102 using network 130, alternative implementations of the example distributed computing system 100 may include any number of clients 140 suitable to the purposes of the example distributed computing system 100.

Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer 140*a*, laptop/notebook computer 140*b*, wireless data port (not shown), tablet computing device 140*c*, smartphone 140*d*, personal data assistant (PDA), one or more processors within these devices, or any other suitable processing device. For example, the client 140 may comprise a computer that includes an input device, such as a keypad, touch screen, or other device that can accept user information, and an output device that conveys information associated with the operation of the EPS 102 or the client 140 itself, including digital data, visual and/or audio information, or a GUI 142, as shown with respect to the client 140.

While FIG. 1 is described as containing or being associated with a plurality of elements, not all elements illustrated within environment 100 of FIG. 1 may be utilized in each alternative implementation of the present disclosure. For example, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
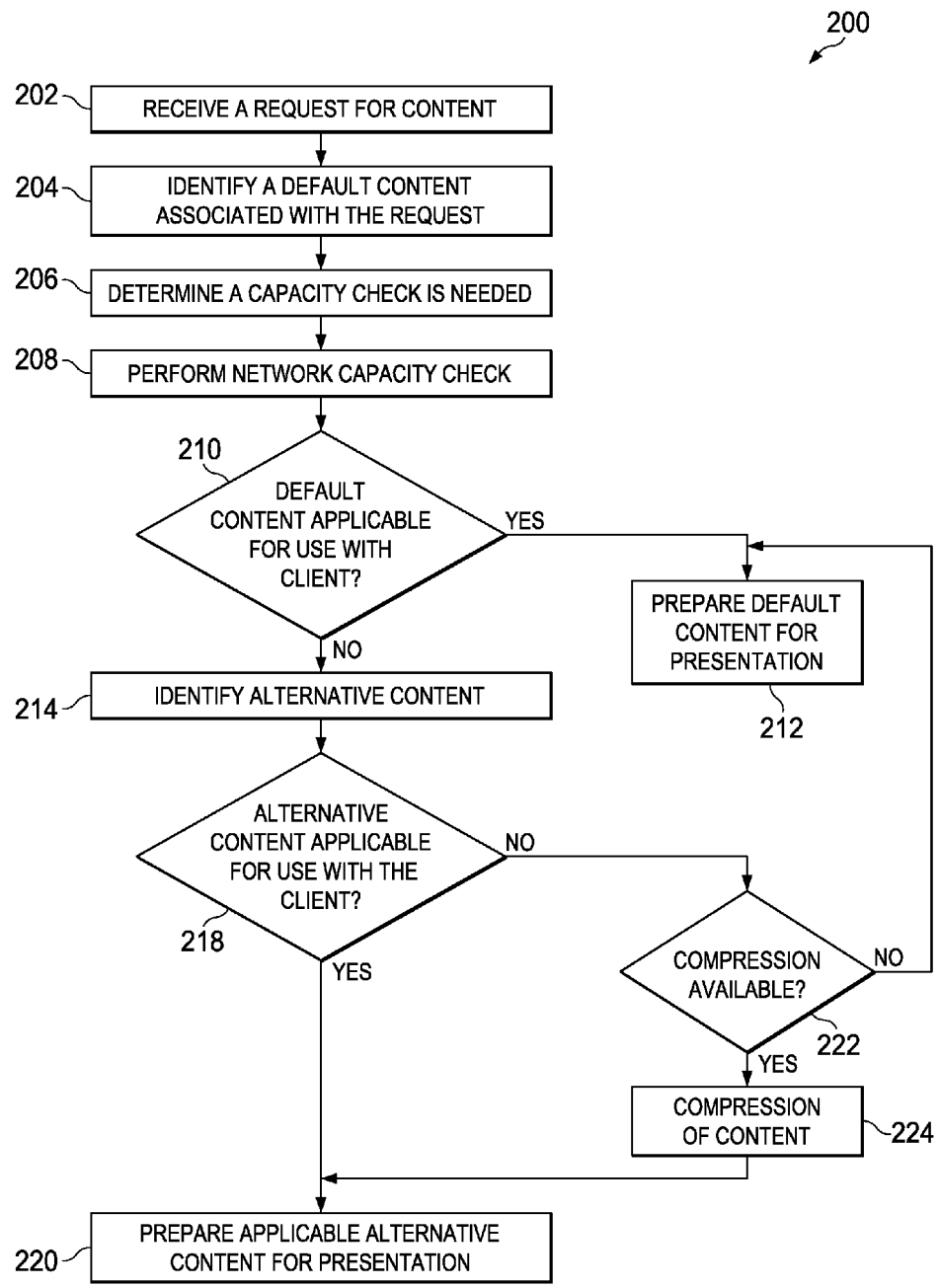
FIG. 2 is a flow chart illustrating an example method for providing network-applicable content.

FIG. 2 is a flow chart illustrating an example method 200 for providing a network-applicable content. For clarity of presentation, the description that follows generally describes method 200 in the context of FIG. 1. However, it will be understood that method 200 may be performed, for example, by any other suitable system, environment, software, and hardware, or a combination of systems, environments, software, and hardware as appropriate.

At 202, a request from a client for a set of content is received. The set of content could be a portal document, a webpage, a video clip, a movie stream, or other suitable content. The set of content may include a plurality of components. For example, a webpage may be requested by the client. The webpage may include text, images, flashes, video, or any other possible components.

At 204, a default set of components associated with the request set of content is identified. In some implementations, the default set of components can be identified based on the administrative definitions. For example, components of particular sizes, qualities, and/or formats can be identified as the default set of components associated with the requested set of content.

At 206, a network capability check may be determined to be needed. The determination that the network capability check is needed can be based on, among other things, receiving a request for network capability check from the client, identifying a session length exceeded a predefined session length and/or identifying a delay or error (such as a 404 message, a Not Found error message, or a request failure) in communication with the client during operations. In some instances, when and how to perform the network capability check may be application specific. For example, implementing system may be configured to check the network capability every few minutes for some applications and every few seconds for some other applications.

At 208, a network capacity check is performed. In some implementations, the network capability check can be performed by, for example, the network check module 109 illustrated in FIG. 1. The network capability check may include one or more of a network type check, a device type check, and a connection quality check, as well as other suitable checks and tests. Based on at least one of the network type, the device type, the connection quality, and combinations thereof, the status of the network capability associated with the client can be identified, and the implementing system can adapt the content for presentation at the client.

The network capability check can be performed in various ways. Some information may be derived from the request received from the client and related data. For example, the device type information can be obtained from a request header (such as User-Agent field) when the implementing system receives the client's request for content. The network type information may be obtained, for example, by using JavaScript in a hybrid container in an HTML application. The connection quality may be obtained from a cookie check when a session is active. In some implementations, the connection quality check may be performed by, for example, a bandwidth test identifying a current bandwidth used by the device, and/or a data rate test identifying a current downloading/uploading speed of the device. In some instances, the connection quality may be derived based at least in part on a delay and/or an error rate of the communication during operations. For example, the implementing system may record the delay or the error rate of a service provided on this connection at runtime. If the service experiences severe delay or packet loss, the connection quality can be considered as poor.

In some implementations, the implementing system, such as the EPS 102 illustrated in FIG. 1, may explicitly request network-related information from the client and/or the network. For example, the implementing system may send a request to and receive a response from the client with information such as the device type, the network type, current bandwidth/speed. Based at least in part on the client's response, the implementing system can identify the current network capability associated with the client.

At 210, a determination as to whether the default set of components are applicable for use with the client is made. In some instances, the determination can be made based on whether the default set of component is compatible with the network capability associated with the client. In some implementations, the determination can be made based on whether an available download speed meets a minimum speed requirement and whether the client is capable of presenting each of the default components associated with the requested set of content. In some implementations, the determination is based on a set of administrative settings defined for at least a portion of the default components based on the identified capability associated with the client. For example, the set of administrative settings defined for the portion of the default components can include priority assignments to particular default components, where the lower priority of an assignment to a particular default component relative to another default component can result in the lower priority default component being substituted with an alternative component where the default components are determined not to be applicable with the capability associated with the client.

At 212, if the default set of components is determined to be applicable with the client, the default set of components are prepared and/or provided for presentation.

At 214, if the default set of components are determined to be inapplicable with the client, at least one alternative component associated with the requested set of content may be identified. The alternative component may include at least one of the following: content at a different resolution than the corresponding default component, content at a different compression ratio than the corresponding default component, and/or content in a different format than the corresponding default component. In some instances, one or more alternative components associated with the requested set of content may be readily available at or by reference to the implementing system. For example, the system may have both a high definition version and a low definition version of a video as alternative components to a standard definition version video identified as the default component for a particular page. In some instances, if there is no available alternative component associated with the requested set of content, the alternative component set can be regarded as "blank."

At 218, a determination is made as to whether the at least one alternative component is applicable with the network capability associated with the client. The determination can be made similarly to the determination of the default component at 210. In some implementations, the determination of the applicability of the alternative component may be further based on the preferences of a user of the client, such as whether to allow using alternative components for presentation. As an example, if the user does not allow using alternative components associated with the request set of content for presentation, method 200 may proceed to 212, where the default set of components are prepared for presentation (not illustrated). The user preferences may include one or more of default user settings (such as 126 as illustrated in FIG. 1 stored in the EPS's memory 110), or dynamic user selections. In the case of dynamic user selections, the user preferences may be requested or otherwise identified at runtime (not illustrated). For example, the implementing system may send a request to the client, where the request appears as a pop-up window in the GUI of the client. The user may select or input his preferences on the size, quality, and formats, among others, of a content component that he would like to view. Based at least in part on the dynamic user preferences, the implementing system can then determine whether the alternative component is applicable for use with the client.

At 220, if the alternative component is applicable for use with the client, the alternative set of components is prepared and/or provided for presentation.

If the alternative component is not applicable with the network capability associated with the client, a further check to determine if any content conversion can be made to generate network-applicable content can be made. At 222, a check if any appropriate compression method is available is made. If available, the compression can be performed at 224 to generate an applicable alternative component, and the applicable alternative component can be prepared for presentation at 220. Otherwise, method 200 proceeds to 212 where the default set of components are prepared for presentation. In some implementations, before a conversion is made, a further request for approval from the client regarding converting at least a portion of the default components to an applicable format may be made at runtime (not shown). After receiving the approval, the conversion of the portion of the default components to an applicable format can be made.

Figure 3:
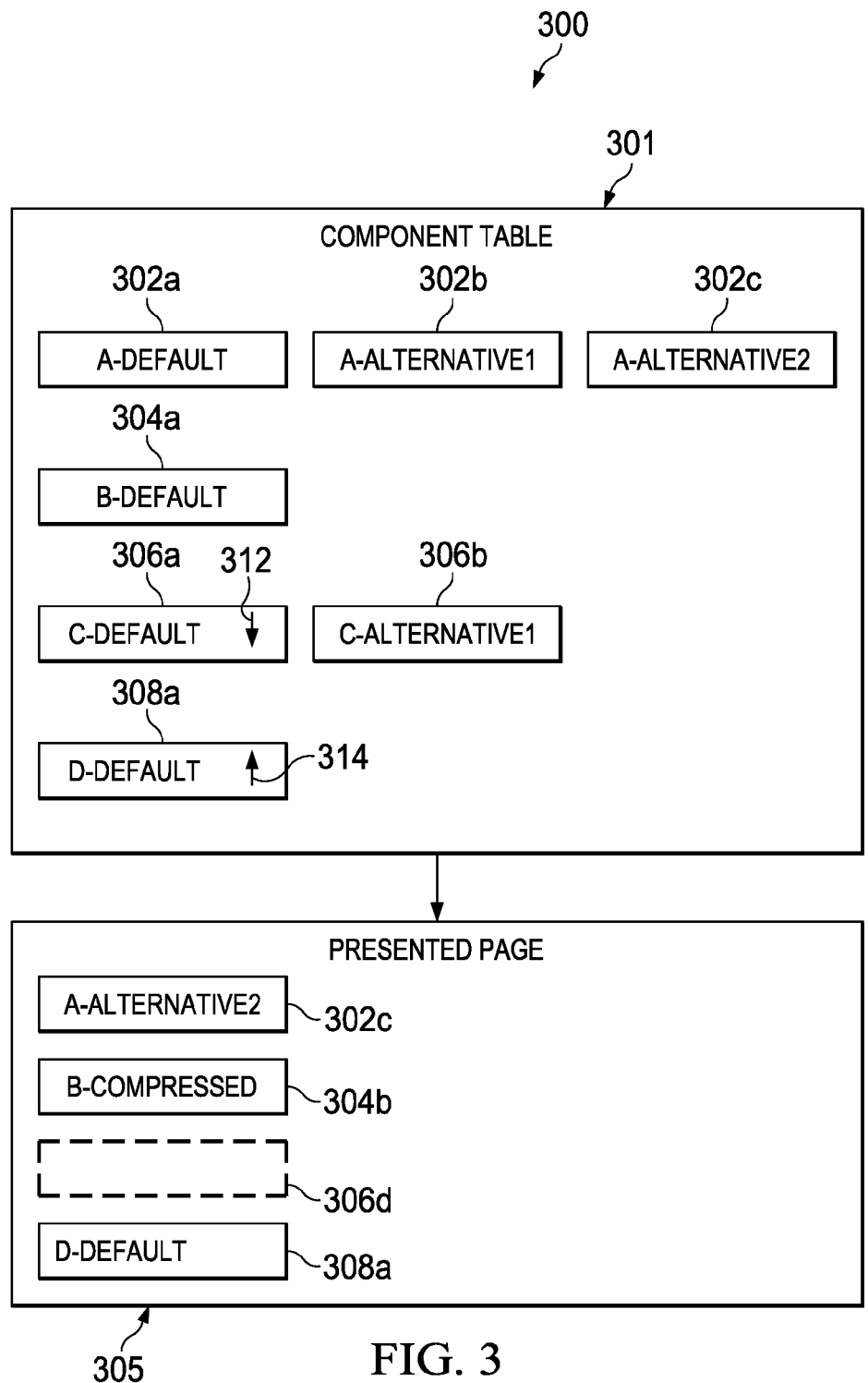
FIG. 3 illustrates an example component table of a set of content and an example presented page after adjustments of the set of content.

FIG. 3 illustrates an example component table 301 of a set of default and alternative content associated with a particular portal page and an example presented page 305 after network-applicable adjustments to the set of content presented to a particular client after performing, for example, the operations described in FIG. 2. The example component table 301 shows the particular set of content contains components A, B, C, and D. Their corresponding default components are A-Default 302a, B-Default 304a, C-Default 306a, and D-Default 308a, respectively. In addition to A-Default 302a, two alternative components are available for component A, and are denoted as A-Alternative1 302b and A-Alternative2 302c. These alternatives may be, for example, image files at different resolutions than A-Default 302a. The component C-Default 306a also has an alternative component C-Alternative1 306b. As illustrated, the component C-default 306a is tagged with a relatively lower priority 312, while the component D-default 308a is tagged with a relatively higher priority 314.

When a request for the particular set of content is received, the default set of components, namely, A-Default 302a, B-Default 304a, C-Default 306a, and D-Default 308a, can be identified. If a portion of the default set of components is determined to not be applicable with the current network capability (determined, for example, by one or more of the network checks described above), the administrative settings, the user's settings, or any other suitable criteria, suitable adjustments can be made by an implementing system (such as the EPS 102 of FIG. 1) to provide network-applicable content to a client for presentation.

For example, the two alternative components A-Alternative1 302b and A-Alternative2 302c of the default component A-Default 302a can be identified. The implementing system may identify A-Alternative2 302c as a network-applicable component based on the current network capability, the administrative settings related to the component A, the user's settings, or any other suitable criteria.

For component B-Default 304a, no alternative component is available in the illustrated example. The implementing system may convert the default component to a network-applicable form. As an example, the implementing system may perform a suitable compression algorithm to compress component B-Default 304a into a component B-Compressed 304b. In some instances, such a conversion can be conducted only if the user agrees to compress the particular component.

For component C-Default 306a, the alternative component C-Alternative1 306b may be identified. In some instances, component C-Alternative1 306b may also not be compatible with the current network capabilities. Since the component C-Default 306a is tagged as relatively lower priority 312 than the other components in component table 301, component C-Default 306a (and its alternatives) may be omitted for presentation, such as when the network capability is determined to be poor. In some implementations, the component C-Default 306a may be replaced with, for example, a blank image or empty border 306d on the presented page 305. The omitted component may be prepared for presentation if the user requests to view it after initial presentation of the presented page 305, such as by clicking or otherwise activating the area associated with the omitted component, a button within the omitted area, or any other suitable UI element. When components are omitted, certain default UI elements (e.g., buttons) may be provided in, around, or to indicate the omitted items, allowing users to easily identify the missing components.

Component D-Default 308a is illustrated as being tagged with a relatively higher priority 314. Thus the D-Default 308a can be preserved for presentation, even in situations where it may otherwise be omitted, compressed, replaced, or otherwise changed, where appropriate.

As a result, after the adjustments, the example presented page 305 contains A-Alternative2 302*c*, B-Compressed 304*b*, D-Default 308*a*, and a blank image 306*d* for the omitted component C. Depending on the determined network capabilities and any administrative and/or user settings, any suitable combination of components may be used such that the presented page 305 is optimized for its intended client.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for providing network-applicable content to a client, the method comprising:
    identifying a first set of content requested by the client, the first set of content associated with a default set of components for presentation;
    determining, prior to providing the requested content to the client, that a network capability check associated with the client is needed, wherein determining that the network capability check is needed comprises:
        receiving a request for network capability check from the client;
        identifying a session length exceeded a predefined session length; and
        identifying a delay or error in communication with the client during operations;
    in response to determining that the network capability check is needed, performing a network capability check associated with the client;
    determining, based on the network capability check of the client, whether the default set of components associated with the first set of content is applicable for use with the client;
    providing the default set of components associated with the first set of content for presentation where the default set is determined to be applicable with the client; and
    responsive to determining that the default set is not applicable with the client:
        identifying at least one alternative component associated with the first set of content for presentation; and
        providing the at least one alternative component associated with the first set of content for presentation.

2. The method of claim 1, wherein the network capability check comprises one or more of a network type check, a device type check, and a connection quality check.

3. The method of claim 2, wherein the determination of whether the default set of components associated with the first set of content is applicable with the client is based on at least one of the following:
    whether an available download speed meets a minimum speed requirement; and
    whether the client is capable of presenting each of the default set of components associated with the first set of content.

4. The method of claim 1, further comprising checking preferences of a user of the client in using at least one alternative component associated with the first set of content for presentation.

5. The method of claim 1, wherein the at least one alternative component includes at least one of the following: content at a different resolution than the corresponding default component, content at a different compression ratio than the corresponding default component, or content in a different format than the corresponding default component.

6. The method of claim 1, further comprising determining whether the at least one alternative component is applicable for use with the client, wherein the determination is based at least in part on whether the at least one alternative component is compatible with the network capability associated with the client.

7. The method of claim 6, wherein determining whether the at least one alternative component is applicable with the client is based at least in part on preferences of a user of the client.

8. The method of claim 6, further comprising:
    determining that the at least one alternative component is not applicable with the client; and
    requesting approval from the client to convert at least a portion of the default set of components to a applicable format at runtime.

9. The method of claim 8, further comprising, in response to receiving approval from the client:
    converting the portion of the default set of components from an original format into a format applicable with the client; and
    providing the converted portion of the default set of components associated with the first set of content for presentation.

10. The method of claim 1, wherein the determination based on the network capability check of the client is based on a set of administrative settings defined for at least a portion of the default set of components based on the identified capability associated with the client.

11. The method of claim 10, wherein the set of administrative settings defined for the portion of the default set of components includes priority assignments to particular default components, where a lower priority of an assignment to a particular default component relative to another default component can result in the lower priority default component being substituted with an alternative component where the default components are determined not to be applicable with the capability associated with the client.

12. The method of claim 1, wherein providing the at least one alternative component associated with the first set of content for presentation further comprises providing an enhanced user experience for the client if the network capability allows.

13. A computer program product encoded on a tangible, non-transitory storage medium, the product comprising computer readable instructions for causing one or more processors to perform operations comprising:
    identifying a first set of content requested by a client, the first set of content associated with a default set of components for presentation;
    determining, prior to providing the requested content to the client, that a network capability check associated with the client is needed, wherein determining that the network capability check is needed comprises:
        receiving a request for network capability check from the client;
        identifying a session length exceeded a predefined session length; and
        identifying a delay or error in communication with the client during operations;

in response to determining that the network capability check is needed, performing the network capability check associated with the client;

determining, based on the network capability check of the client, whether the default set of components associated with the first set of content is applicable for use with the client;

providing the default set of components associated with the first set of content for presentation where the default set is determined to be applicable with the client; and responsive to determining that the default set is not applicable with the client:

identifying at least one alternative component associated with the first set of content for presentation; and providing the at least one alternative component associated with the first set of content for presentation.

14. The computer program product of claim 13, wherein the at least one alternative component includes at least one of the following: content at a different resolution than the corresponding default component, content at a different compression ratio than the corresponding default component, or content in a different format than the corresponding default component.

15. The computer program product of claim 13, wherein providing the at least one alternative component associated with the first set of content for presentation comprises providing an enhanced user experience for the client if the network capability allows.

16. A system, comprising:

one or more processors;

memory storing one or more programs for execution by the one or more processors, the one or more programs operable when executed to:

identify a first set of content requested by a client, the first set of content associated with a default set of components for presentation;

determine, prior to providing the requested content to the client, that a network capability check associated with the client is needed, wherein determining that the network capability check is needed comprises:

receiving a request for network capability check from the client;

identifying a session length exceeded a predefined session length; and identifying a delay or error in communication with the client during operations;

in response to determining that the network capability check is needed, perform a network capability check associated with the client;

determine, based on the network capability check of the client, whether the default set of components associated with the first set of content is applicable for use with the client;

provide the default set of components associated with the first set of content for presentation where the default set is determined to be applicable with the client; and responsive to determining that the default set is not applicable with the client:

identify at least one alternative component associated with the first set of content for presentation; and provide the at least one alternative component associated with the first set of content for presentation.

17. The system of claim 16, wherein the at least one alternative component includes at least one of the following: content at a different resolution than the corresponding default component, content at a different compression ratio than the corresponding default component, or content in a different format than the corresponding default component.

18. The system of claim 16, wherein providing the at least one alternative component associated with the first set of content for presentation comprises providing an enhanced user experience for the client if the network capability allows.

* * * * *